United States Patent
Morello et al.

(10) Patent No.: US 12,511,404 B1
(45) Date of Patent: Dec. 30, 2025

(54) REMEDIATING VULNERABILITIES USING SOFTWARE UPDATE MANAGEMENT PLATFORM WITH INTEGRATED THREAT INTELLIGENCE

(71) Applicant: MINIMUS LTD, Tel Aviv (IL)

(72) Inventors: John Morello, Baton Rouge, LA (US); Ben Bernstein, New York, NY (US); Dima Stopel, Herzliya (IL)

(73) Assignee: MINIMUS LTD, Tel Aviv (IL)

( * ) Notice: Subject to any disclaimer, the term of this patent is extended or adjusted under 35 U.S.C. 154(b) by 0 days.

(21) Appl. No.: 19/191,033

(22) Filed: Apr. 28, 2025

Related U.S. Application Data

(60) Provisional application No. 63/734,282, filed on Dec. 16, 2024, provisional application No. 63/720,901, filed on Nov. 15, 2024.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 9,959,104 B2 | 5/2018 | Chen et al. | |
| 9,983,891 B1 | 5/2018 | Christensen | |
| 10,505,830 B2 | 12/2019 | Mishalov et al. | |
| 10,885,378 B2 | 1/2021 | Li et al. | |
| 11,062,022 B1* | 7/2021 | Kalamkar | G06F 9/45558 |
| 11,182,140 B2 | 11/2021 | Riek et al. | |
| 11,599,348 B2 | 3/2023 | Goldmann et al. | |
| 11,669,362 B2 | 6/2023 | Singh et al. | |
| 11,972,333 B1 | 4/2024 | Horesh et al. | |

(Continued)

FOREIGN PATENT DOCUMENTS

CN 111522628 A 8/2020

OTHER PUBLICATIONS

"Announcing 'Yum + RPM for Containerized Applications'—Nulecule & Atomic App," Red Hat Blog (Jun. 23, 2015) (available at https://www.redhat.com/en/blog/announcing-yum-rpm-containerized-applications-nulecule-atomic-app) (last accessed Nov. 7, 2024, at 4:27 PM Eastern time).

(Continued)

*Primary Examiner* — Khoi V Le
(74) *Attorney, Agent, or Firm* — M&B IP Analysts, LLC

(57) ABSTRACT

A system and method for vulnerability remediation. A method includes identifying a vulnerable software package among a plurality of software packages based on cybersecurity data indicating a vulnerability; identifying at least one vulnerable software image of a plurality of software images by determining that the at least one vulnerable software image contains the vulnerable software package based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images; and performing at least one remediation action with respect to the at least one vulnerable software image.

17 Claims, 8 Drawing Sheets

(56) References Cited

U.S. PATENT DOCUMENTS

| | | | |
|---|---|---|---|
| 12,095,806 B1* | 9/2024 | Nemtsov | G06F 21/55 |
| 12,099,414 B2 | 9/2024 | Mitkar et al. | |
| 12,242,994 B1 | 3/2025 | Aggarwal et al. | |
| 12,267,345 B1* | 4/2025 | Erlingsson | G06F 9/5072 |
| 2011/0225574 A1 | 9/2011 | Khalidi et al. | |
| 2012/0110333 A1 | 5/2012 | Lukkarila et al. | |
| 2012/0324446 A1 | 12/2012 | Fries et al. | |
| 2015/0365437 A1* | 12/2015 | Bell, Jr. | G06F 21/54 |
| | | | 726/1 |
| 2017/0147813 A1 | 5/2017 | McPherson et al. | |
| 2019/0347127 A1 | 11/2019 | Coady et al. | |
| 2020/0159536 A1 | 5/2020 | Saidi | |
| 2020/0213357 A1 | 7/2020 | Levin et al. | |
| 2020/0285504 A1 | 9/2020 | Siegmund | |
| 2020/0326931 A1 | 10/2020 | Nadgowda et al. | |
| 2021/0157623 A1 | 5/2021 | Chandrashekar et al. | |
| 2021/0208916 A1 | 7/2021 | Wang et al. | |
| 2021/0255840 A1 | 8/2021 | Novy | |
| 2021/0319109 A1 | 10/2021 | Weng et al. | |
| 2022/0147378 A1 | 5/2022 | Tarasov et al. | |
| 2022/0166626 A1 | 5/2022 | Madisetti et al. | |
| 2023/0168986 A1* | 6/2023 | Larkin | G06N 20/00 |
| | | | 717/127 |
| 2024/0069883 A1 | 2/2024 | Griffin et al. | |
| 2024/0103833 A1 | 3/2024 | Shemer et al. | |
| 2024/0134967 A1 | 4/2024 | Yaron et al. | |
| 2024/0411674 A1 | 12/2024 | Zmigrod et al. | |
| 2025/0004741 A1 | 1/2025 | Hubik | |
| 2025/0123819 A1 | 4/2025 | Khemka et al. | |
| 2025/0156535 A1 | 5/2025 | Keller et al. | |

OTHER PUBLICATIONS

Ian Gorton et al.; Components in the Pipeline; IEEE; pp. 34-40; retrieved on Jul. 18, 2025 (Year: 2025).

* cited by examiner

REMEDIATING VULNERABILITIES USING SOFTWARE UPDATE MANAGEMENT PLATFORM WITH INTEGRATED THREAT INTELLIGENCE

CROSS-REFERENCE TO RELATED APPLICATIONS

This application claims the benefit of U.S. Provisional Patent Application No. 63/734,282 filed on Dec. 16, 2024. This application also claims the benefit of U.S. Provisional Patent Application No. 63/720,901 filed on Nov. 15, 2024.

All of the applications referenced above are hereby incorporated by reference.

TECHNICAL FIELD

The present disclosure relates generally to software image management, and more specifically to remediating vulnerabilities using software image management with integrated threat intelligence.

BACKGROUND

Software images are files containing code and other resources used to realize one or more software components. Example software images include software container images used to realize software containers, as well as virtual machine (VM) images used to realize virtual machines. Executing the code within a software image causes a software component such as a container or virtual machine to be deployed within a computing environment.

Updates in code included in software images may result in changes to how the corresponding software component behaves. Code may be updated, for example, to improve software performance or to patch out vulnerabilities. For example, when a vulnerability in code may expose the software component to cybersecurity threats, the code of the software component is used to realize that software component may be updated in order to patch out the vulnerability. As a result, maintaining software images can serve to maintain performance and/or security within a computing environment.

Solutions which aid in maintaining software images in order to secure computing environments in which those software images are deployed would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for vulnerability remediation. The method comprises: identifying a vulnerable software package among a plurality of software packages based on cybersecurity data indicating a vulnerability; identifying at least one vulnerable software image of a plurality of software images by determining that the at least one vulnerable software image contains the vulnerable software package based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images; and performing at least one remediation action with respect to the at least one vulnerable software image.

Certain embodiments disclosed herein also include a non-transitory computer-readable medium having stored thereon causing a processing circuitry to execute a process, the process comprising: identifying a vulnerable software package among a plurality of software packages based on cybersecurity data indicating a vulnerability; identifying at least one vulnerable software image of a plurality of software images by determining that the at least one vulnerable software image contains the vulnerable software package based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images; and performing at least one remediation action with respect to the at least one vulnerable software image.

Certain embodiments disclosed herein also include a system for vulnerability remediation. The system comprises: a processing circuitry; and a memory, the memory containing instructions that, when executed by the processing circuitry, configure the system to: identify a vulnerable software package among a plurality of software packages based on cybersecurity data indicating a vulnerability; identify at least one vulnerable software image of a plurality of software images by determining that the at least one vulnerable software image contains the vulnerable software package based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images; and perform at least one remediation action with respect to the at least one vulnerable software image.

Certain embodiments disclosed herein include a method, non-transitory computer-readable medium, or system as noted above or below, wherein performing the at least one remediation action includes modifying a deployment of at least a portion of the at least one vulnerable software image.

Certain embodiments disclosed herein include a method, non-transitory computer-readable medium, or system as noted above or below, wherein performing the at least one remediation action includes pulling a deployment of at least a portion of the at least one vulnerable software image.

Certain embodiments disclosed herein include a method, non-transitory computer-readable medium, or system as noted above or below, wherein performing the at least one remediation action includes redeploying at least a portion of the at least one vulnerable software image Certain embodiments disclosed herein include a method, non-transitory computer-readable medium, or system as noted above or below, wherein performing the at least one remediation action includes rebuilding at least a portion of the at least one vulnerable software image based on the plurality of files.

Certain embodiments disclosed herein include a method, non-transitory computer-readable medium, or system as noted above or below, wherein the at least one vulnerable software image is a plurality of vulnerable software images, further including or being configured to perform the following step or steps: determining a subset of the plurality of vulnerable software images to be remediated based on a vulnerability status of each of the plurality of vulnerable software images, wherein the deployment of the determined subset of the plurality of vulnerable software images is modified.

Certain embodiments disclosed herein include a method, non-transitory computer-readable medium, or system as noted above or below, wherein the vulnerability status of each of the plurality of vulnerable software images indicates whether the vulnerable software image contains a vulnerability that is actively being exploited, wherein the determined subset of the plurality of vulnerable software images is at least one vulnerable software image of the plurality of software images which contains a vulnerability that is actively being exploited.

Certain embodiments disclosed herein include a method, non-transitory computer-readable medium, or system as noted above or below, further including or being configured to perform the following step or steps: generating the plurality of software packages, wherein each software package of the plurality of software packages is generated using a respective set of code; building the plurality of software images based on the plurality of files; and storing the plurality of software images in a repository.

Certain embodiments disclosed herein include a method, non-transitory computer-readable medium, or system as noted above or below, wherein each software package is a unit of code defined with respect to at least one function.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
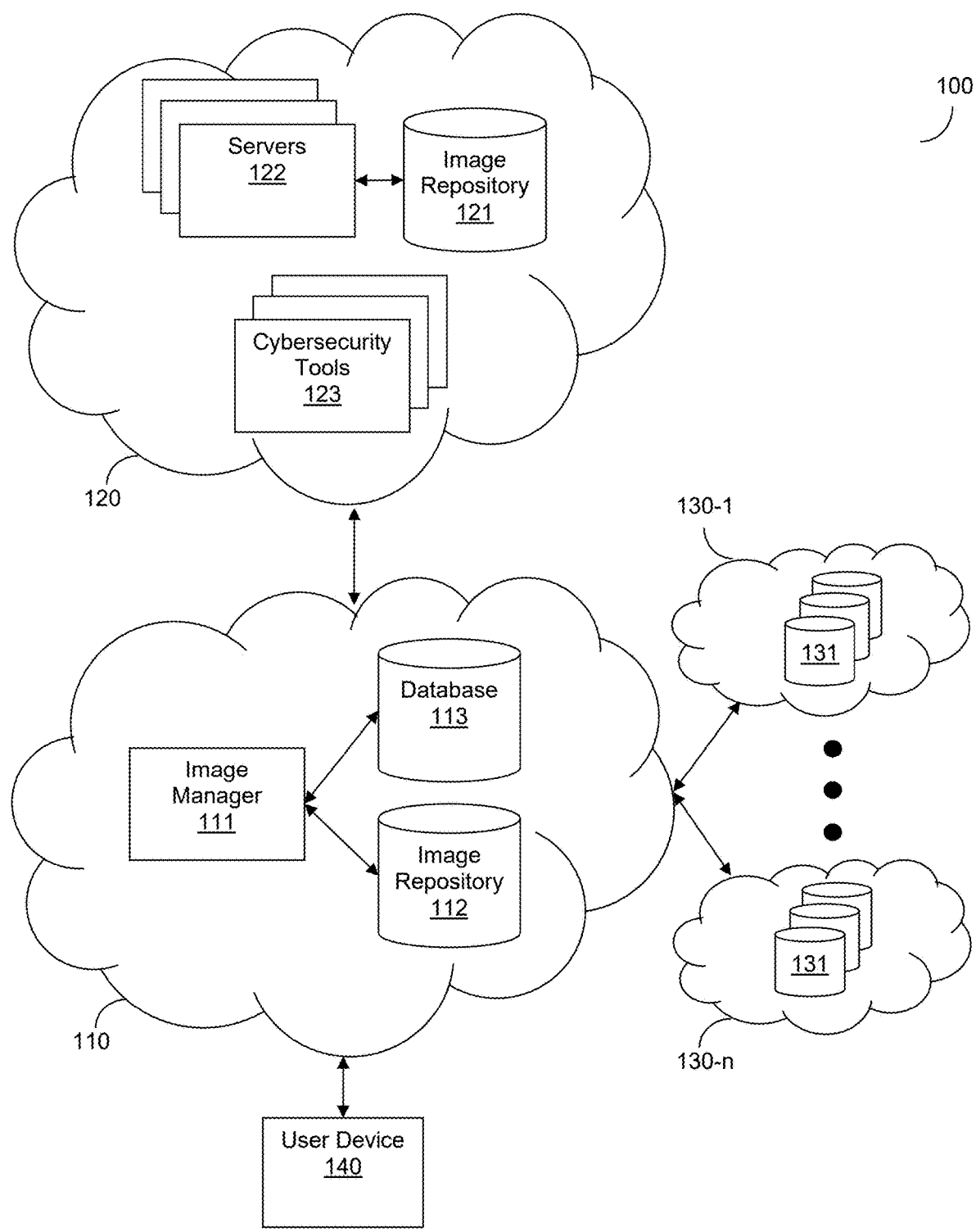
FIG. 1 is a network diagram utilized to describe various disclosed embodiments.

The various disclosed embodiments include techniques for vulnerability remediation which may be realized via or using a software image update management platform. The disclosed embodiments may be utilized to remediate vulnerabilities related to software images. Each software image is a file including executable code utilized to realize a given software component such as, but not limited to, a software container, a virtual machine, and the like. More specifically, each software image includes all of the code utilized to run a given software component, and may further include libraries, binaries, settings, and other data used to realize the corresponding software component. When a software image is for a virtual machine, the software image may further include an operating system, applications, and other data used to realize a virtual machine. Various disclosed embodiments may allow for efficiently identifying vulnerable software images in order to more quickly and more efficiently remediate potential vulnerabilities in those software images.

In an embodiment, a vulnerable package containing code which includes a vulnerability is identified. Software images containing vulnerable packages are identified using the software image recipes, and any or all of the software images containing vulnerable packages may be rebuilt using packages containing new code (e.g., new code releases designed to patch or otherwise address the vulnerability).

To facilitate identifying software images which may require remediation, various disclosed embodiments leverage software image recipes used to combine packages of code and configure images according to a predefined set of heuristics. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component.

Software components built and configured using a given recipe corresponding to a respective software image may be identified for remediation based on their respective recipes. That is, software images whose recipes include code which has been identified as containing a vulnerability may be determined to be vulnerable software images, and remediation actions may be performed with respect to vulnerable software images (for example, by rebuilding the software image or redeploying the software image by reconstructing the software image using a rebuilt or otherwise updated version of the software image).

More specifically, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package. The description of how to obtain the latest version or release of the code of each package may be or may include an indication of a location where each portion of code for each package is stored (e.g., in one or more code repositories).

Accordingly, the software image recipes provide instructions for building software images defined with respect to code units in the form of packages, where combinations of packages may be used to realize different software images. In this regard, the packages may act as building blocks for software images, with the software image recipes providing the directions for combining these building blocks in order to assemble the code of a software image. That is, the packages may be adapted to perform discrete functions or sets of functions which might be utilized by different software images such that a given package may be used to provide its respective functions to different software images whose software image recipes indicate that the package is to be used for building their corresponding software images. In accordance with various disclosed embodiments, the recipes may be referenced in order to detect vulnerabilities in software images. That is, the software recipe for a given software image indicates which packages are included in the software image. Any software image whose recipe indicates that the image contains a package identified as containing vulnerable code may therefore be identified as a vulnerability software image.

In an embodiment, using software image recipes, software images are built. More specifically, the definitions among the software image recipes are used to identify portions of code belonging to packages for each software image. The portions of code may include, but are not limited to, binaries and any associated files. The portions of code are obtained and used to create the packages. Using the software image recipes, sets of the packages are combined into software images and configured. The software images may be stored in a repository for subsequent use, for example, in order to provide the software images to systems or external image repositories for deployment within a computing environment.

In various embodiments, the repository storing the software images may be managed including by updating images in the repository. More specifically, when a given portion of code (e.g., a given binary) used by a package is subject to a code release, the new version of that portion of code may be obtained and used to recreate the package. Once the package has been recreated, the software image may be rebuilt using the recreated package according to the software image recipe of the software image. The rebuilt software image may be stored in the repository or otherwise used, thereby updating the software image.

In order to aid in managing the repository, in an embodiment, a pipeline is established with respect to code dependencies. The pipeline defines dependencies between portions of code among different packages, and therefore defines relationships between such portions of code which may be used to determine when a package should be updated. That is, when a portion of code is the subject of a new code release or otherwise when a new version of that code is made available, any package containing that code or containing code which depends from that code may be identified for recreation. To this end, code releases may be monitored in order to identify upstream releases or other project updates for code among the packages indicated among the software image recipes. When a project update is detected, any packages containing code which has been updated in the project update may be recreated, and any software images built using packages which have been recreated may be rebuilt.

In some embodiments, in order to reduce the amount of computing resources utilized to rebuild and transmit software images, software images may be redeployed or otherwise acted upon to remediate vulnerabilities based on a set of vulnerability remediation rules. Such vulnerability remediation rules may define conditions for remediating vulnerabilities. The vulnerability remediation rules may define triggers for redeploying software images such that, for example, a software image is only rebuilt, transmitted, redeployed, or a combination thereof, when a redeployment trigger is detected with respect to the software image. Further, any or all of the redeployment triggers may be defined with respect to cybersecurity data such as, but not limited to, alerts or other cybersecurity data indicating that a vulnerability is being exploited. More specifically, using such cybersecurity data, a vulnerable package may be identified.

Various disclosed embodiments therefore utilize a platform for maintaining software images in a manner that allows for automatically rebuilding software images with new code as new code releases are provided. By defining software image recipes with respect to combinations of code packages, each software image may effectively be defined with respect to a set of discrete units of code. This allows for identifying updates to code used by different software images, thereby allowing for automatically identifying code updates which affect certain software images and therefore indicate that a given software image might be rebuilt. Identifying images to be rebuilt in this manner, in turn, allows for maintaining images with current versions of code, which improves security of computing environments in which the software containers are deployed.

In addition to improved maintenance of software images and the security of computing environments in which those images are deployed, redeploying software images based on status in accordance with certain embodiments allows for more efficiently deploying software images. In some embodiments, software images may only be rebuilt, redeployed, or both, when certain conditions are satisfied. Accordingly, computing resources associated with rebuilding software images and transmitting rebuilt software images may be conserved while maintaining cybersecurity within computing environments in which the software images are deployed. That is, software images which are potential security risks may either be rebuilt when vulnerabilities in those software images are being exploited, or rebuilt as updates occur and redeployed when vulnerabilities in those software images are being exploited. Likewise, disruptions to operations within the computing environment related to redeploying or otherwise pulling deployment of software images may be minimized while still improving cybersecurity within the computing environment.

In this regard, image repositories populated using software images as described herein may act as trusted sources for vulnerability-free or otherwise updated images such that, when images are redeployed from these trusted repositories, cybersecurity within a given computing environment is improved. Moreover, by storing and providing software as fully built images, challenges with respect to installing individual packages within other software and potential compatibility issues may be avoided, thereby providing a smoother code deployment.

FIG. 1 shows an example network diagram 100 utilized to describe various disclosed embodiments. In the example network diagram 100, computing environments 110 through 130 communicate with each other and with a user device 140 in order to realize various software image management techniques discussed herein. Any or all of such communications may be realized via one or more networks (not shown). Such a network may be, but is not limited to, a wireless, cellular or wired network, a local area network (LAN), a wide area network (WAN), a metro area network (MAN), the Internet, the worldwide web (WWW), similar networks, and any combination thereof.

As depicted in FIG. 1, the computing environment 110 is a computing environment in which an image manager 111 is deployed or otherwise realized. The image manager 111 may be realized as or via a server (not separately depicted). An example schematic diagram which may be utilized to realize such a server is discussed further below with respect to FIG. 8.

The image manager 111 is configured to manage software images used in one or more computing environments such as, but not limited to, the computing environment 120. More specifically, the image manager 111 is configured to build software images using software image recipes as described herein. As noted herein, such software image recipes may be, may include, or may otherwise be realized as a file including a set of instructions for building and configuring a software component such as a software container or virtual machine according to a predetermined definition of the software component. Such a recipe may be defined with respect to a set of packages as well as configuration data for configuring a software component containing these packages. The packages, in turn, are packages of code which may include code stored in one or more code repositories such as, but not limited to, the code repositories 131.

The software images created using the recipes may be stored in an image repository 112 for subsequent use. The recipes, along with other data used to build the software images (e.g., code retrieved from the code repositories 131, packages created using such code, and the like), may be stored in a database 113.

In accordance with various disclosed embodiments, the image manager 111 is configured to utilize integrated cybersecurity threat intelligence data in order to remediate vulnerabilities with respect to the software images. More specifically, in an embodiment, the image manager 111 is configured to identify vulnerable packages indicated in cybersecurity data ingested from cybersecurity tools such as, but not limited to, the cybersecurity tools 123. In a further embodiment, the image manager 111 is further configured to identify software images containing the identified vulnerable packages based on the software image recipes as described herein. In this manner, the recipes may be utilized to facilitate identifying which software images are affected by a given vulnerability, which in turn allows for remediating vulnerabilities more quickly, more accurately, or both.

The computing environment 120 may be a client computing environment in which one or more servers 122 acting as clients for the image manager 111, the image repository 112, or both. To this end, the computing environment 120 includes one or more servers 122 running code used to realize software applications or otherwise to run code and, more specifically, to run code of software components including code among software images as discussed herein. To this end, the computing environment 120 may further include an image repository 121 utilized to store software images built by the image manager 111.

The computing environment 120 may further include one or more cybersecurity tools 123. Such cybersecurity tools 123 may be configured to monitor for potential cyber threats, to alert on potential cyber threats, to mitigate or remediate potential cyber threats, a combination thereof, and the like. In particular, in accordance with various disclosed embodiments, the cybersecurity tools 123 may be configured to alert on potential cyber threats and to include data indicating potentially vulnerable software images or portions thereof (e.g., packages), which in turn may be utilized to determine which software images may require rebuilding or redeployment (e.g., redeployment of the corresponding software component) as described herein. To this end, such alerts may be sent from the cybersecurity tools 123 to the servers 122, to the image manager 111, or both.

The computing environments 130-1 through 130-n (where n is an integer having a value greater than or equal to 1, also referred to as a computing environment 130 or as computing environments 130 for simplicity) may each include one or more code repositories 131. Such code repositories 131 may store code and, in particular, code released by developers or other entities that provide code intended to be packaged with other code to create code packages. Such code may be updated, for example, in new code releases, in order to patch vulnerabilities or otherwise improve the code. Code stored in the code repositories 131 may be downloaded (e.g., by the image manager 111) and utilized to build software images as discussed herein.

The user device 140 may be, but is not limited to, a personal computer, a laptop, a tablet computer, a smartphone, a wearable computing device, or any other device capable of receiving and displaying notifications. The user device 140 may be owned, operated, or otherwise used by a person or entity which may manage code deployed in the computing environment 120. As a non-limiting example, the user device 140 may be operated by a developer who manages code at least some of the software components deployed in the computing environment 120. The user device 140 may receive notifications (e.g., from the image manager 111) indicating that certain software images have been built or rebuilt and stored in the image repository 112. The user device 140 may be used to cause the servers 122 to download such software images for software component deployment (e.g., to download such software images and either store those in local storages of the servers 122, in the image repository 121, or both).

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure. For example, the image manager 111 may be deployed or otherwise realized in the computing environment 120 used to host the servers 122 on which software components are deployed without departing from the scope of at least some disclosed embodiments. Generally speaking, in at least some embodiments, any of the computing environments 110 through 130 may be combined at least partially (e.g., combining entities from different computing environments), or may be further separated into more computing environments (not shown), without departing from the scope of the disclosure.

Figure 2:
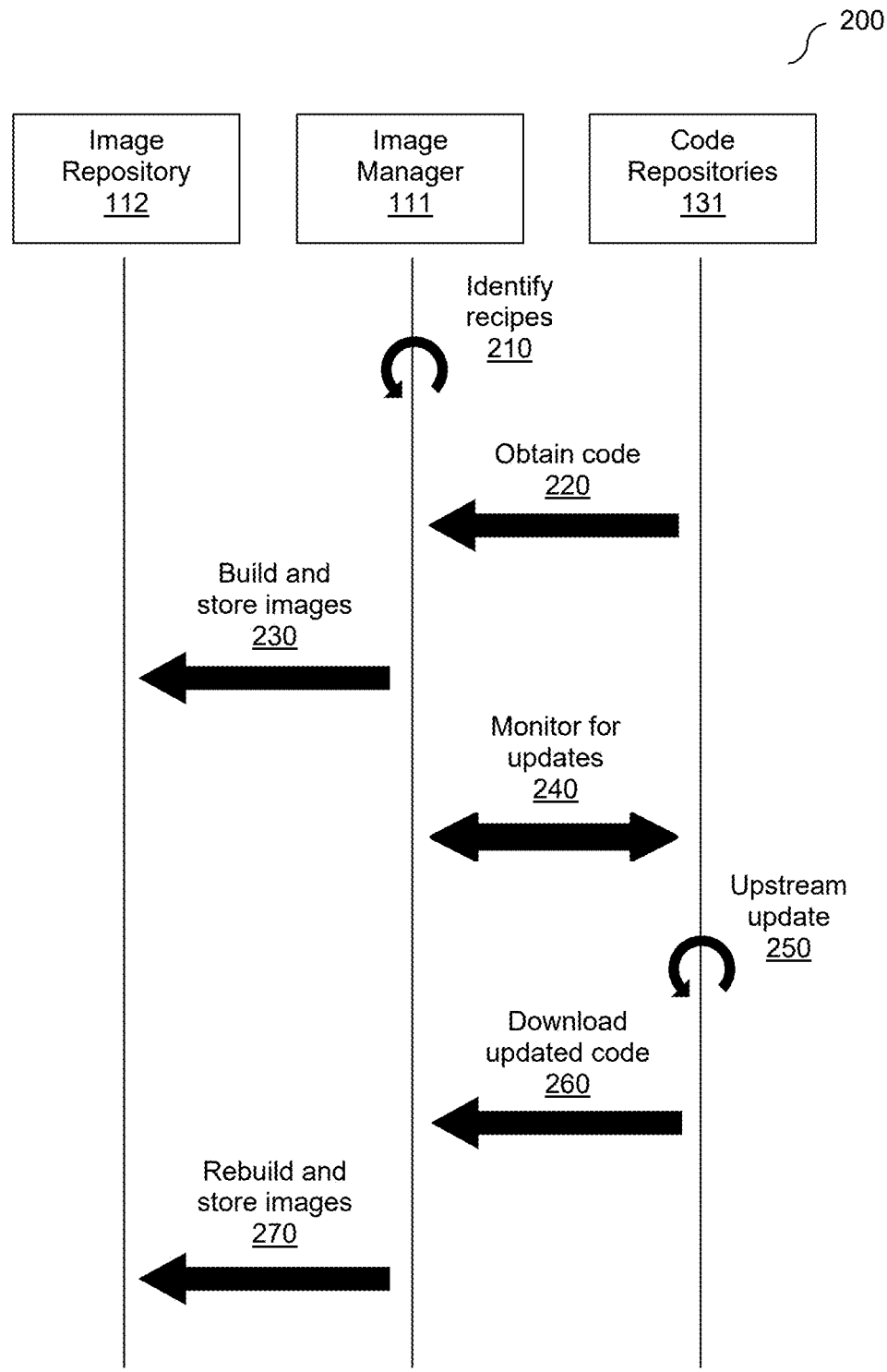
FIG. 2 is a flow diagram illustrating building and maintaining an image repository in accordance with various disclosed embodiments.

FIG. 2 is a flow diagram 200 illustrating building and maintaining an image repository in accordance with various disclosed embodiments. FIG. 2 depicts communications between and among the image repository 112, the image manager 111, and the code repositories 131, FIG. 1.

As depicted in FIG. 2, at 210, the image manager 111 identifies one or more software image recipes to be utilized for building software images in order to populate the image repository 112. Such recipes may be predetermined or otherwise provided by an entity that designs software images for use in deploying software components. As discussed herein, each recipe is a file including code defining packages to be combined in order to build a corresponding software image.

At 220, the image manager 111 obtains code from one or more of the code repositories 131. As discussed herein, such code includes code used to create packages or otherwise to build software images. The obtained code may be obtained as packages, or may be obtained as other discrete portions of code to be used for creating packages. When the software images are virtual machine images or other software images which utilize additional code or to run, the obtained code may further include such additional code (e.g., code of kernels and operating systems used to realize virtual machines).

At 230, the image manager 111 builds one or more software images and stores the built software images in the image repository 112. More specifically, as described herein, the image manager 111 builds the software images using software image recipes (e.g., the recipes identified at 210). That is, the image manager 111 builds the software images by combining packages and configuring the software images according to their corresponding recipes. When the software images are virtual machine images or other software images which utilize additional code to run, the software images may be built to include such code.

Once the image repository 112 has been populated with images built using the recipes, the image repository 112 may be updated as code used by those images are updated. To this end, in some embodiments, at 240, the image manager 111 monitors for updates to code in the code repositories 131 in order to identify updates to code (e.g., code releases) for code used by software images.

More specifically, as described herein, the image manager 111 may be configured to monitor for updates with respect to upstream code (e.g., as determined based on code dependencies of code in software images). When an upstream update occurs in one of the code repositories at 250, the image manager 111 may download the updated code at 260. The updated code, in turn, may be utilized to rebuild and store one or more of the software images at 270 (e.g., software images including older versions of the updated code may be rebuilt with the updated code).

It should be noted that FIG. 2 depicts a flow including both building and rebuilding images, but these processes may be realized as separate flows without departing from the scope of the disclosure. Additionally, in some embodiments, updated code may only be downloaded, images may only be rebuilt, or both, when certain conditions are met. As a non-limiting example, code may only be automatically downloaded and used to rebuild images when the code contains a vulnerability patch or other cybersecurity-relevant updates. In such embodiments, code may be manually downloaded and used to rebuild images at the direction of an operator (e.g., a user of the user device 140, FIG. 1) when inputs indicating certain portions of code to download, certain software images to check for potential code updates, or both, are received.

Figure 3:
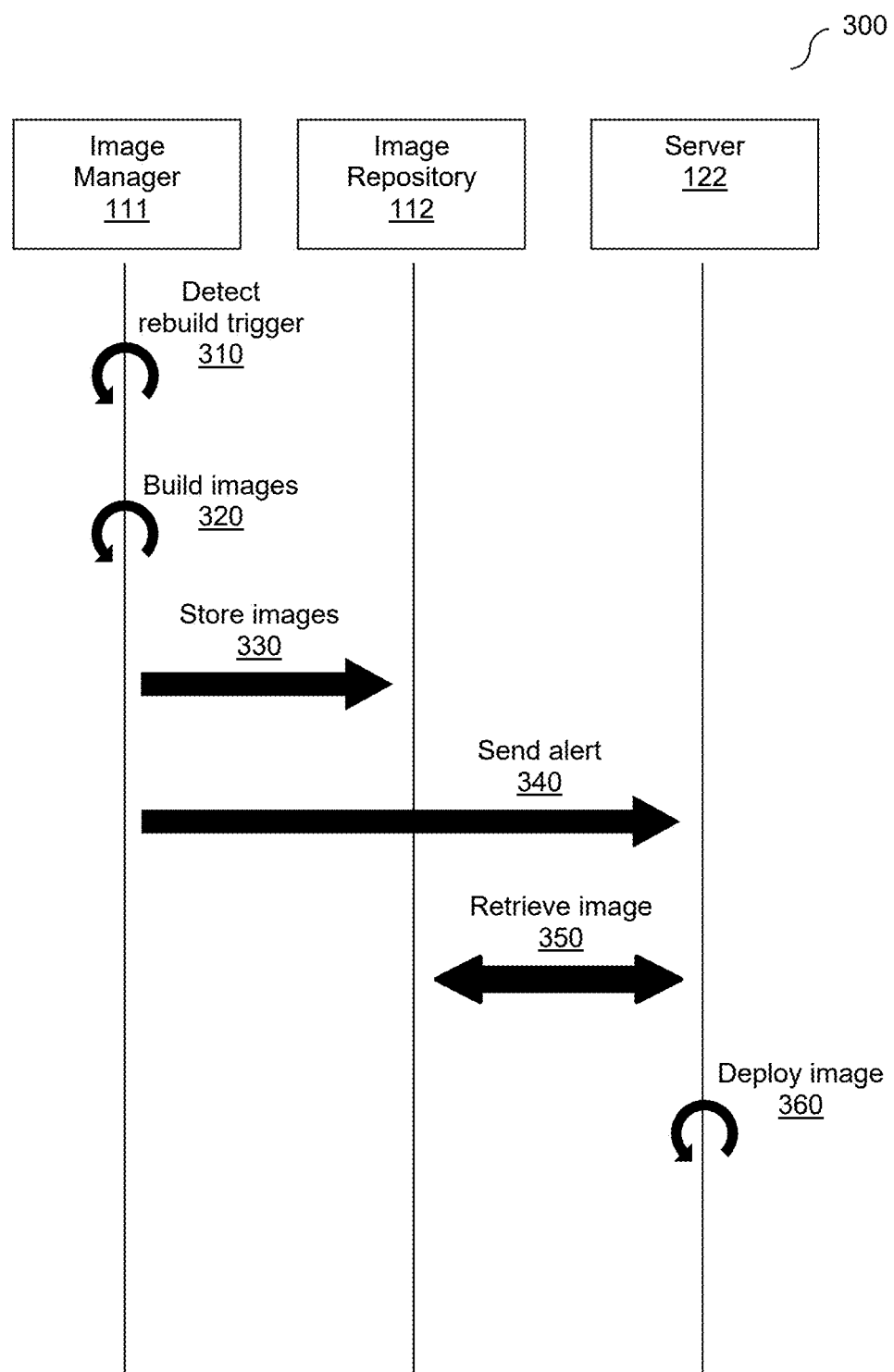
FIG. 3 is a flow diagram illustrating providing a new image for deployment in accordance with various disclosed embodiments.

FIG. 3 is a flow diagram 300 illustrating providing a new image for deployment in accordance with various disclosed embodiments. FIG. 3 depicts communications between and among the image repository 112, the image manager 111, and the server 122, FIG. 1.

As depicted in FIG. 3, optionally at 310, a rebuild trigger is detected. Such a rebuild trigger may be an update to code used by a software image, or may be such an update which meets certain criteria (e.g., includes vulnerability patches or other cybersecurity-related updates).

At 320, software images are built or rebuilt by the image manager 111. When images are rebuilt, updated code for those images may be downloaded and used for rebuilding. At 330, the newly built or rebuilt images are stored in the image repository 112.

At 340, the image manager 111 may generate and send an alert to one of the servers 122. The alert may indicate, for example, that a given software image has been rebuilt and is available for download, whether the software image includes a cybersecurity update (e.g., includes code with a vulnerability patch), both, and the like.

When the server 122 has received the alert, the server 122 may retrieve an image from the image repository 112 at 350 and deploy the retrieved image (e.g., by running the image in order to deploy the corresponding software component for the image).

It should be noted that FIG. 3 depicts the server 122 retrieving an image directly from the image repository 112 in accordance with at least some embodiments, but that the image may be obtained by the server 122 in other ways in at least some embodiments. For example, in some embodiments, the image manager 111 may transmit the image to the server 122 at 340 in addition to or instead of sending the alert.

Figure 4:
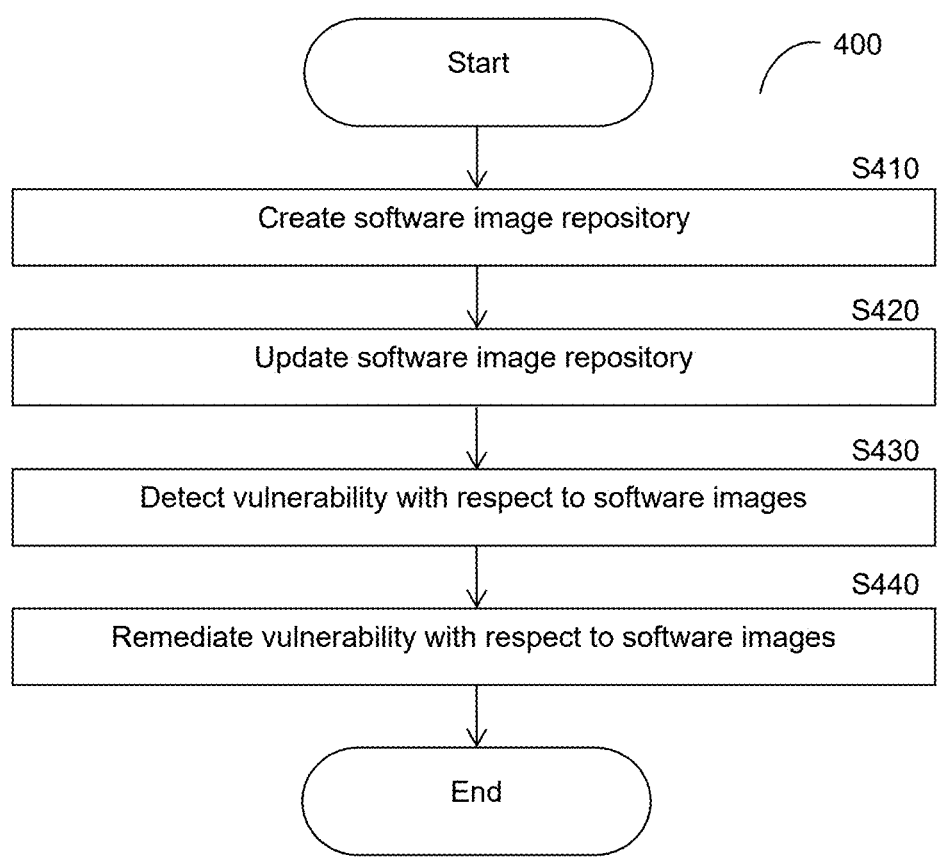
FIG. 4 is a flowchart illustrating a method for software image update management according to an embodiment.

FIG. 4 is a flowchart 400 illustrating a method for software image update management according to an embodiment. In an embodiment, the method is performed by the image manager 111, FIG. 1.

At S410, a software image repository is created. In an embodiment, creating the software image repository includes building one or more software images according to respective software image recipes and storing the built images in the software image repository.

As discussed herein, such a software image recipe may be or may include a file having executable code utilized to realize a given software component such as, but not limited to, a software container, a virtual machine, and the like. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component.

More specifically, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package, a location (e.g., a location within a repository or otherwise a location in storage) of the package or of the code used to create the package, both, and the like. The description of how to obtain the latest version or release of the code of each package may be or may include an indication of a location where each portion of code for each package is stored (e.g., in one or more code repositories).

Each software image built using a corresponding software image recipe includes all of the code utilized to run a given software component, and may further include libraries, binaries, settings, and other data used to realize the corresponding software component. When a software image is for a virtual machine, the software image may further include an operating system, applications, and other data used to realize a virtual machine. The corresponding software image recipe for a given software image may therefore identify such code and other data (e.g., by location in storage, by identifier, by a combination thereof, and the like) such that a software image may be built at least by combining packages identified in the corresponding software image recipe.

An example process for creating a software image repository is described further below with respect to FIG. 5.

At optional S420, the software image repository may be updated. As a non-limiting example, as new code releases are made available such that code used by software images becomes updated, some or all of those software images may be updated accordingly by downloading new code, packaging the new code into new packages, and combining the new packages according to the corresponding software image recipes for software images. To this end, in an embodiment, updating the software image repository includes rebuilding one or more of the software images stored in the software image repository. An example process for updating the software image repository is described further below with respect to FIG. 6.

At S430, a vulnerability is detected with respect to one or more of the software images in the software image repository. In an embodiment, detecting the vulnerability includes identifying a vulnerable package based on cybersecurity data such as cybersecurity threat intelligence data, and identifying one or more vulnerable software images which contain the vulnerable package based on the software image recipes stored in the software image repository.

In a further embodiment, S430 also includes determining which vulnerabilities to be remediated, which software images for which remediation should be performed, both, and the like. As discussed further below with respect to FIG. 7, vulnerability remediation rules may be defined so as to only require remediating certain kinds of vulnerabilities or otherwise vulnerabilities having certain statuses (e.g., actively being exploited).

Accordingly, in at least some embodiments, the detected vulnerability may act as a software image redeployment trigger, and S430 may further include detecting such a redeployment trigger. The redeployment trigger may be defined such that software images are only redeployed when certain criteria are met. To this end, in an embodiment, detecting the software image redeployment trigger includes applying one or more vulnerability remediation rules defining triggers for redeployment with respect to such criteria. In some embodiments, the vulnerability remediation rules may be defined such that the trigger is detected when a vulnerability in a software image is being exploited.

An example process for detecting a vulnerability with respect to software images based on cybersecurity data and software images recipes which may be utilized at S430 is described further below with respect to FIG. 7.

At S440, the detected vulnerability is remediated with respect to vulnerable software images containing the vulnerable code (e.g., code of the vulnerable packages). In an embodiment, remediating the detected vulnerability includes acting to secure one or more computing environments with respect to one or more vulnerable software images containing vulnerable code. In a further embodiment, remediating the detected vulnerability includes modifying a deployment of one or more vulnerable software images (e.g., pulling deployment of vulnerable software images, redeploying vulnerable software images, both, and the like).

Accordingly, acting to secure the computing environments may include performing one or more actions with respect to the vulnerable software images such as, but not limited to, pulling one or more of the vulnerable software images from deployment, redeploying one or more of the vulnerable software images, rebuilding one or more of the vulnerable software images, providing a rebuilt or otherwise updated version of a software image (e.g., updated with a newer version of a package which was identified as vulnerable), a combination thereof, and the like.

In an embodiment, when the actions include rebuilding one or more of the vulnerable images, those vulnerable images are rebuilt according to their corresponding software image recipes using patched or otherwise updated packages (e.g., packages containing updated code designed to avoid the identified vulnerability which is being exploited). In a further embodiment, rebuilding the vulnerable images includes downloading updated versions of code for use in rebuilding the vulnerable images.

In an embodiment, when the actions include redeploying one or more of the vulnerable images, the rebuilt images are pushed to repositories or otherwise provided to servers used for deploying software components defined by respective software images. In a further embodiment, such servers may be commanded, instructed, or otherwise prompted to retrieve and redeploy the updated version of each vulnerable image currently being used by each server.

In an embodiment, providing the rebuilt or otherwise updated version of the software image includes storing the software image in a repository (e.g., the image repository 112 or the image repository 121, FIG. 1). The software image may be retrieved by one or more servers (e.g., the servers 122, FIG. 1) from the repository, either directly or by sending a request to a system having access to the repository (e.g., the image manager 111, FIG. 1).

In some implementations, the software image may be provided to an air-gapped device which is not connected to any networks. In an embodiment, to support such implementations, providing the software for deployment may include, but is not limited to, storing the software image in a repository which is accessible to a system from which the software image may be loaded onto an external storage (e.g., a Flash drive), which in turn may be connected to the air-gapped device in order to deliver the software images stored on the external storage to the air-gapped device.

When the software image has been stored in such a repository, the external storage may be connected to a system, and the system may be utilized to download or otherwise retrieve the software image from the repository. The system may further be used to load the software image onto the external storage, and the external storage may be moved to a physical location of the air-gapped device in order to allow for connecting the external storage to the air-gapped device. When the external storage is connected to the air-gapped device, the software image may be copied or transferred to the air-gapped device.

Figure 5:
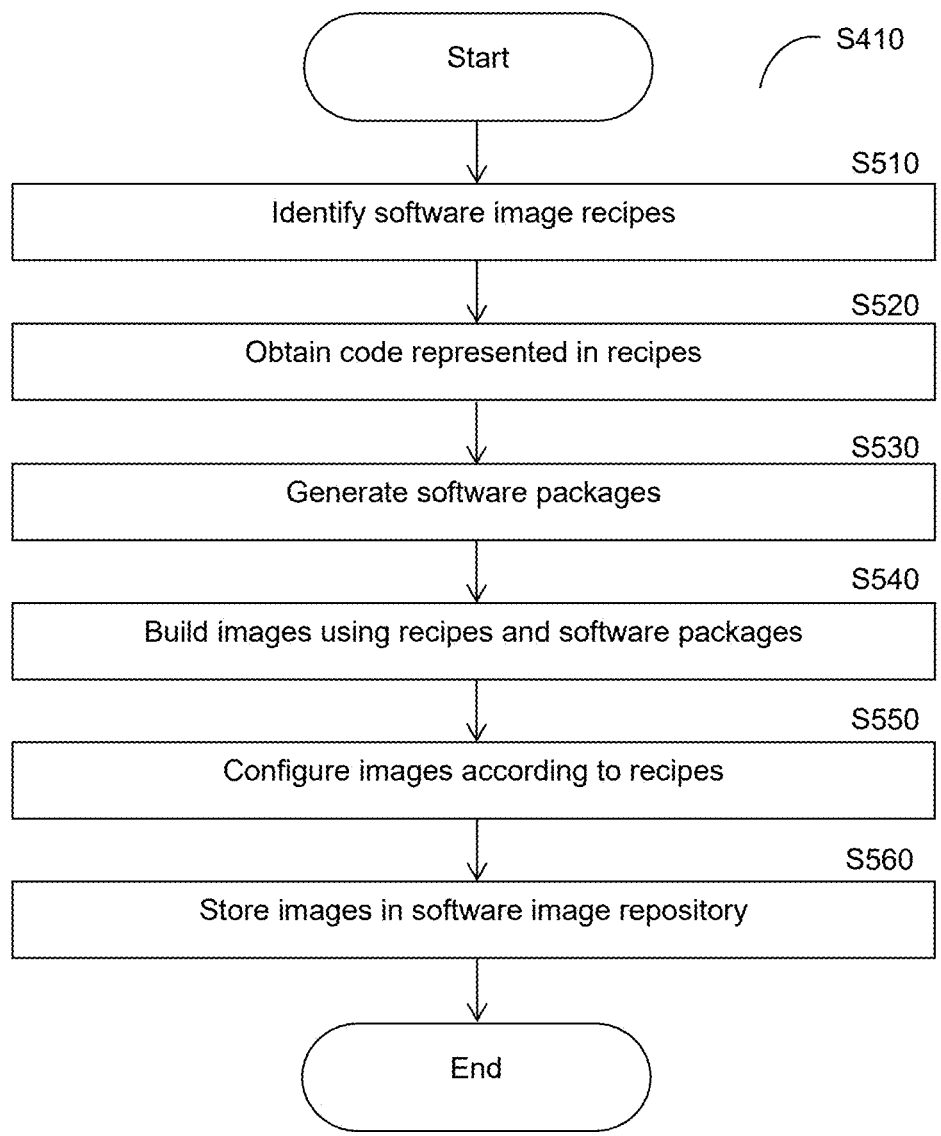
FIG. 5 is a flowchart illustrating a method for creating a software image repository according to an embodiment.

FIG. 5 is a flowchart S410 illustrating a method for creating a software image repository according to an embodiment.

At S510, software image recipes to be used for creating software images are identified. The identified software image recipes may be or may include software image recipes among a predetermined list of recipes to be used for populating, for example, a given software image repository. Such a predetermined list may be defined, for example, by an entity which owns or operates a computing environment (e.g., the computing environment 120, FIG. 1) in which the software image repository resides, a computing environment in which servers utilize software images stored in the software image repository to deploy software components, both, and the like.

As noted above, each software image recipe may be or may include a file having executable code utilized to realize a given software component such as, but not limited to, a software container, a virtual machine, and the like. To this end, in an embodiment, each software image recipe is realized as a file including a set of instructions for building and configuring a software component such as a software container or virtual machine according to a predetermined definition of the software component. The set of instructions of each software image recipe may therefore be utilized to effectuate a set of rules for building and configuring the software component.

In a further embodiment, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package as discussed above, for example with respect to FIG. 4. In yet a further embodiment, the set of instructions for each software image recipe further defines a configuration for the corresponding software image, and the software image built using a corresponding software image recipe is configured in order to match the configuration defined in the corresponding software image recipe.

At S520, code of software packages (also referred to as packages) represented in the identified software image recipes is obtained. Such code may be, for example but not limited to, retrieved from one or more code repositories (e.g., one or more of the code repositories 131, FIG. 1). The code may include, but is not limited to, binaries or other code to be included in respective packages. In an embodiment, S520 may further include obtaining any associated files (e.g., files associated with respective binaries containing libraries or other resources to be used by those binaries).

In an embodiment, the code may be included in package definitions of packages which define portions of code to be utilized for creating each package. Such package definitions may identify code with respect to identifier, location (e.g., location in storage), and the like. In such an embodiment, the code may therefore be obtained based on such package definitions, for example by obtaining code having certain identifiers or locations in storage.

At S530, software packages (also referred to as packages) are generated using the obtained code. In an embodiment, the packages may be generated using package generation rules which define how each package is to incorporate each portion of code included therein. More specifically, the package generation rules may define templates or other predetermined portions of packages into which portions of code are to be inserted or otherwise which are to be combined with portions of code.

In some embodiments, any or all of the obtained code may be retrieved in a pre-packaged format (e.g., already organized into software packages). In such embodiments, any such pre-packaged software packages may be utilized to build software images during subsequent processing.

At S540, software images are built using their corresponding software image recipes and the packages generated at S530, any pre-packed software packages, or both. That is, each software image is built using its corresponding software image recipe by at least combining packages according to the software image recipe. More specifically, for each recipe, a subset of the packages generated at S530 or otherwise a subset of a set of packages is combined in order to build the corresponding software image for the recipe.

At S550, the software images are configured according to their corresponding software image recipes. As noted above, each software image recipe may include configuration instructions or otherwise provide configuration data indicating how the software image is to be configured.

At S560, the built software images are stored in one or more software image repositories (e.g., the repository 112, FIG. 1) for subsequent use or access.

Figure 6:
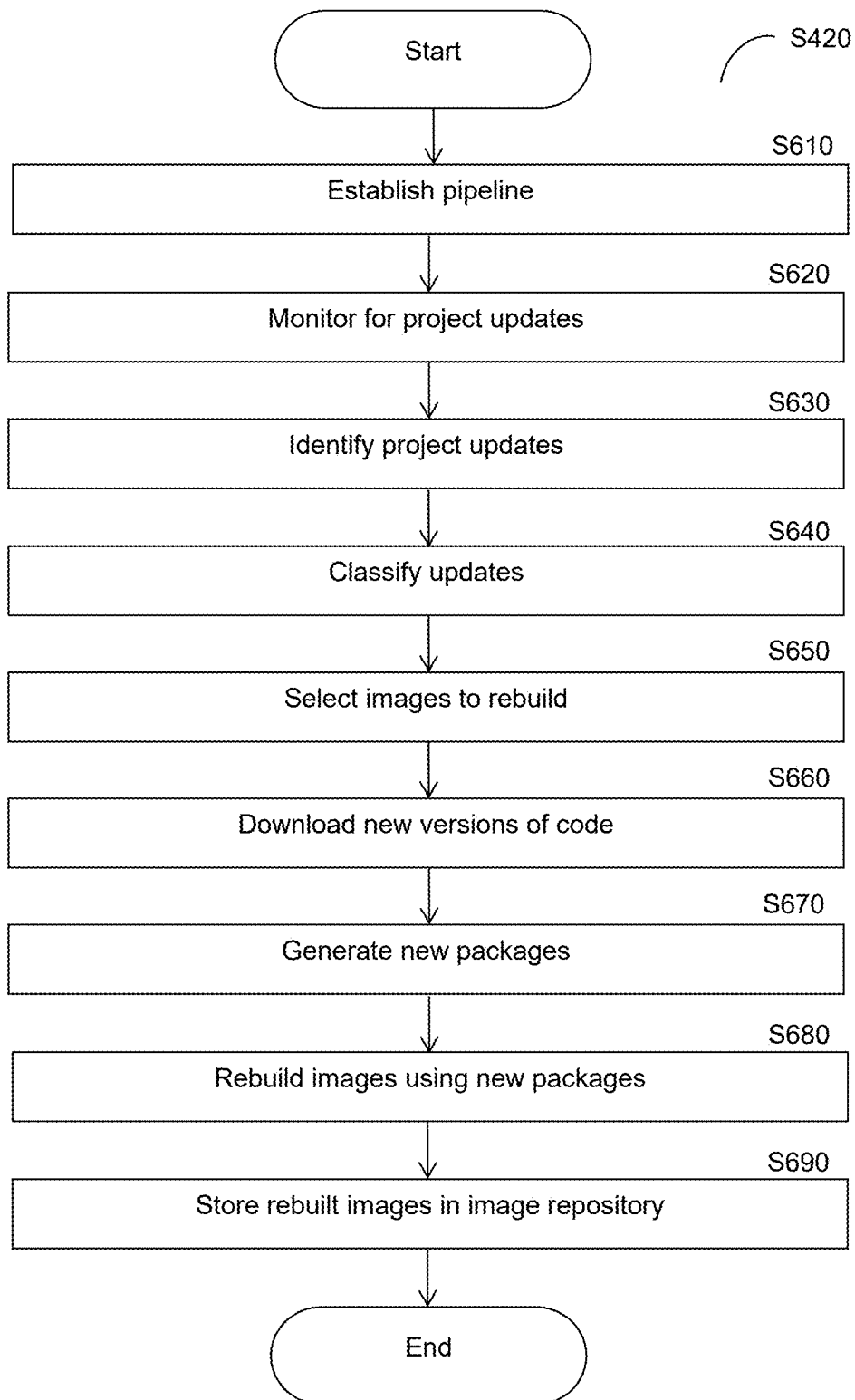
FIG. 6 is a flowchart illustrating a method for updating a software image repository according to an embodiment.

FIG. 6 is a flowchart S420 illustrating a method for updating a software image repository according to an embodiment.

At S610, a pipeline is established at least with respect to software packages used for building software images (e.g., software packages indicated in software image recipes as described herein). The pipeline may be defined with respect to one or more software projects (e.g., a software infrastructure project), and may further be defined from upstream to downstream. That is, the pipeline indicates or otherwise represents dependencies between portions of code deployed as part of the software project from upstream to downstream, where packages or portions of code containing dependencies to other code are considered to be downstream of the other code (which is considered to be upstream of the code which depends from it).

Accordingly, in an embodiment, the pipeline is established with respect to code dependencies. In a further embodiment, the pipeline defines dependencies between portions of code among different packages. That is, the pipeline defines relationships between such portions of code which may be useful for determining when a package is to be updated. When a portion of code is the subject of a new code release or otherwise when a new version of that code is made available, any package containing that code or containing code which depends from that code may be identified for recreation.

At S620, project updates are monitored with respect to the pipeline. In an embodiment, monitoring for project updates includes monitoring code releases, version updates, or other changes in code related to the software project. When a code release or other change to a portion of code used or otherwise upstream from a package indicated in a software image recipe is detected during the monitoring, that code release or other change may be identified as a project update as discussed with respect to S630. A code release may be determined as upstream from a package when the code release is for a portion of code from which the package depends (either directly via a reference to the portion of code among code of the package, or indirectly via a reference to code which in turn references other code that ultimately references the portion of code).

In an embodiment, the project updates may be detected based on certain activities such as, but not limited to, commits. To this end, the monitoring may be performed using update monitoring rules defined with respect to such activities such that project updates are detected when such activities occur (e.g., when a commit is made).

At S630, project updates are identified based on the monitoring. The project updates may be represented in data (e.g., textual data) indicating changes or other data indicative of updates to code used among entities represented in the pipeline. Such textual data may include, but is not limited to, log data, which may include textual data describing the nature of the changes, the reasons for the changes (e.g., to patch out a vulnerability or otherwise improve the code), both, and the like. As noted above, such project updates may be code releases, version updates, or other changes in code.

At optional S640, the identified project updates may be classified into one or more classifications. In an embodiment, classifying the updates includes applying one or more update classification rules defined with respect to, for example, keywords or key terms. As a non-limiting example, updates may be classified as either relating to cybersecurity or not relating to cybersecurity using update classification rules that define a given update as being related to cybersecurity when any of the following terms are included in a description of an update: "patch," "vulnerability," "cybersecurity," "security," and "CVE" (common vulnerabilities and exposures).

In another embodiment, classifying the project updates includes applying one or more machine learning models trained to classify textual data. Such machine learning models may be applied to text indicating changes or other data indicative of project updates identified during the monitoring.

In an embodiment, at least some of the classifications of the project updates are defined with respect to potential cybersecurity risks. That is, the classifications may indicate, for example, whether each update indicates a change meant to mitigate a cyber threat or remediate a vulnerability.

In some embodiments, the applied machine learning models may be or may include a language model such as a large language model (LLM). Such LLMs may be useful for querying with respect to text written in natural language in addition to or instead of code in order to unearth information about the contents of the text, code, or both. To this end, in such embodiments, classifying the project updates may include querying such a language model using a predetermined textual query. As a non-limiting example, such a textual query may be or may include "Please analyze the description of the updates and output a classification of either 'patching a vulnerability' or 'not patching a vulnerability.' The 'patching a vulnerability' output should be output when the description of the update indicates that the update was made to patch or fix a vulnerability in code, or if the code contains changes associated with patching vulnerabilities. The 'not patching a vulnerability' output should be output when the description of the update does not indicate that the update was made to patch or fix a vulnerability in code and the code does not contain any changes associated with patching vulnerabilities."

In yet a further embodiment, such language models may be fine-tuned for classifying upstream changes. Such a fine-tuned model may be created by adjusting weights of a general purpose language model based on further training using training samples which include example text describing project updates, such as samples demonstrating both vulnerability patch updates and other updates (e.g., general performance updates or other changes which may not be related or may not be directly related to cybersecurity). Such a fine-tuned language model may be further trained based on code of such example updates.

At optional S650, software images are selected for rebuilding. In an embodiment, the software images to be rebuilt are selected based on the classifications. In a further embodiment in which the classifications are defined with respect to cybersecurity issues (e.g., "vulnerability patch" or "no patch"), software images including code having project updates classified as being cybersecurity-related (e.g., "vulnerability patch" rather than "no patch") may be selected as the software images to be rebuilt. That is, software images with packages (e.g., as defined in the software image recipe for each software image) containing code that has been updated to patch a vulnerability or otherwise remediate or mitigate a potential cyber threat may be selected for rebuilding.

Classifying updates with respect to cybersecurity factors therefore allows for automatically rebuilding images only when code changes are provided to remediate cybersecurity issues. In turn, such selective automatic rebuilding allows for conserving computing resources related to building, transmitting, storing, and deploying software images. In this regard, it is noted that not all code releases are security critical or otherwise relevant to cybersecurity, and that rebuilding software images using every such non-cybersecurity code release may utilize many computing resources in order to provide updates which do not significantly affect performance. Accordingly, automatically rebuilding images only for security-related updates may allow for conserving computing resources while still allowing for manual updates (e.g., selections of images to be rebuilt by a manual operator) in order to, for example, improve performance of software images.

At S660, new versions of code to be used for rebuilding software images are downloaded based on the identified project updates. When software images to be rebuilt are selected as described with respect to S650, the new versions of code to be downloaded may include new versions of any code included in the selected software images.

At S670, new packages may be generated using the downloaded code. In an embodiment, the new packages may be generated using package generation rules which define how each package is to incorporate each portion of code included therein. More specifically, each package including code which has been identified as being updated may be used to generate a respective new package including the updated code.

At S680, one or more software images are rebuilt using the new packages. In an embodiment, the software images are rebuilt based on their corresponding software image recipes. For any software image recipes identifying packages including one or more of the new packages, the corresponding software image is therefore rebuilt using the new package instead of a previous version of the package, thereby creating an updated software image by rebuilding the software image with one or more new packages containing updated code.

At S690, the rebuilt images are stored in one or more software image repositories (e.g., the repository 112, FIG. 1) for subsequent use or access.

Figure 7:
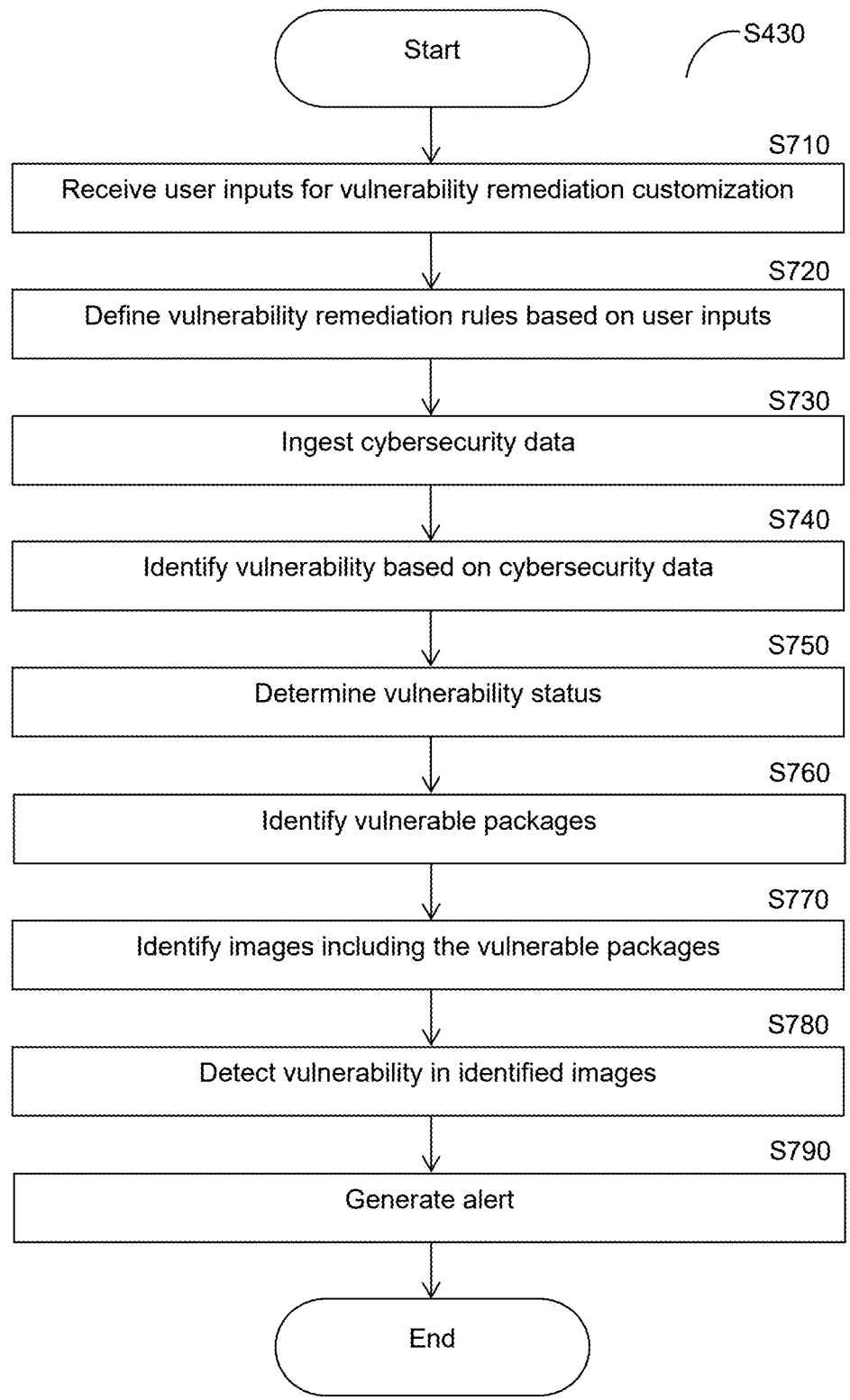
FIG. 7 is a flowchart illustrating a method for detecting a software image redeployment trigger according to an embodiment.

FIG. 7 is a flowchart S430 illustrating a method for detecting a vulnerability with respect to software images according to an embodiment.

At optional S710, user inputs indicating choices for vulnerability remediation customization are received. The user inputs may be received, for example, from a user device (e.g., the user device 140, FIG. 1). The user inputs may indicate, for example, vulnerability statuses of vulnerabilities to be remediated, lists of vulnerabilities (e.g., a list of specific vulnerabilities to be remediated), both, and the like.

In an embodiment, the user inputs are received via one or more user interfaces (e.g., a graphical user interface of a user device). In some implementations, the user interface may be utilized to allow a user to type or otherwise select if/then statements defining conditions for remediation as well as remediation actions to be performed. Moreover, different conditions defined in this manner may have different remediation actions or groups of remediation actions, thereby allowing for further customizing remediation by handling different conditions with different remediation actions.

At optional S720, vulnerability remediation rules are defined based on the user inputs. In an embodiment, the vulnerability remediation rules may define sets of conditions for triggering vulnerability remediation, and may further define sets of remediation actions to be performed for each set of conditions. Such remediation actions may include, but are not limited to, pulling one or more of the vulnerable software images from deployment, redeploying one or more of the vulnerable software images, rebuilding one or more of the vulnerable software images, providing a rebuilt or otherwise updated version of a software image (e.g., updated with a newer version of a package which was identified as vulnerable), a combination thereof, and the like.

In a further embodiment, one or more of the sets of conditions for triggering vulnerability remediation are defined with respect to vulnerability statuses. As discussed further below, such vulnerability statuses may include, but are not limited to, whether the vulnerability is actively being exploited, a type of vulnerability, whether the vulnerability is critical, combinations thereof, and the like.

At S730, cybersecurity data is ingested. The ingested cybersecurity data may include, but is not limited to, events, alerts, notifications, or other data which may indicate potential cyber threats. More specifically, in an embodiment, the cybersecurity data includes data indicating vulnerabilities which are being exploited. In such embodiments, the cybersecurity data may further indicate specific packages, code releases, or other portions of code which include the vulnerability being exploited.

At S740, a vulnerability is identified based on the cybersecurity data. Identifying the vulnerability may include analyzing the cybersecurity with respect to a predetermined structure of the cybersecurity data (e.g., a known structure having a field which corresponds to a vulnerability being exploited) or otherwise analyzing the contents of the cybersecurity data (e.g., analyzing text of the cybersecurity data using natural language processing) in order to identify an indication of a vulnerability indicated in the cybersecurity data.

At optional S750, a vulnerability status is determined for the identified vulnerability. The vulnerability status may include or otherwise indicate, but is not limited to, whether the vulnerability is actively being exploited, a type of vulnerability (e.g., a known type of vulnerability such as a vulnerability having a common vulnerabilities and exposures [CVE] identifier), whether the vulnerability is critical (e.g., whether the vulnerability belongs to a predetermined list of critical vulnerabilities such as a vulnerability associated with a predetermined CVE identifier number), combinations thereof, and the like. In an embodiment, the vulnerability status may be determined based on the analysis of the cybersecurity data.

In some embodiments, determining the vulnerability status further includes determining whether a vulnerability is actively being exploited. That is, the cybersecurity data may indicate whether code having a known vulnerability was detected or whether a vulnerability is currently being exploited by one or more malicious actors (e.g., as determined based on interactions with code containing a vulnerability). As a non-limiting example, an indication in the cybersecurity data that a static code file has been scanned and identified as having a known vulnerability may be indicative that the vulnerability is not actively being exploited when there is not otherwise traffic or other interactions with an instance of a software image running this code is detected, while the vulnerability may be determined as being actively exploited when traffic or other runtime analysis results indicate that the instance of the software image having the file with the known vulnerability is communicating or otherwise interacting with external components (e.g., components outside of that instance of the software image, or components deployed outside of a given computing environment).

As noted herein, in at least some implementations, redeploying or other remediation actions affecting deployment may only be performed for software images which contain vulnerabilities that are actively being exploited.

Also as noted herein, by avoiding redeploying or otherwise modifying the deployment of software images which are not being actively exploited, disruptions to workflows may be minimized while maintaining cybersecurity in a computing environment in which the software images are deployed. That is, operations involving software images having vulnerabilities which are actively being exploited may be allowed to be disrupted by redeploying or otherwise pulling deployments of those software images, while operations involving software images having vulnerabilities which are not actively being exploited may be allowed to continue. In this regard, it is noted that software images having vulnerabilities which are not actively being exploited present less of a threat to cybersecurity within a computing environment then software images having vulnerabilities which are actively being exploited.

At S760, a vulnerable package is identified based on the cybersecurity data. The vulnerable package may be, but is not limited to, a package indicated in the cybersecurity data, or a package containing code indicated in the cybersecurity data. Identifying the vulnerable packages may include analyzing the cybersecurity data with respect to a predetermined structure of the cybersecurity data (e.g., a known structure having a field which corresponds to a vulnerable package or vulnerable code) or otherwise analyzing the contents of the cybersecurity data (e.g., analyzing text of the cybersecurity data using natural language processing) in order to identify an indication of a vulnerable package or portion of code which is being exploited by a given cyber threat.

At S770, software images including the vulnerable package are identified based on software image recipes. In an embodiment, each software image recipe is a file indicating a set of packages which are combined in order to build a corresponding software image. Accordingly, each corresponding software image which is built using one of the software image recipes which indicates the vulnerable package as one of the packages to be combined may be identified as a vulnerable image including the vulnerable package.

At S780, a vulnerability is detected in each of the identified images. More specifically, the vulnerability identified at S740 is detected as being present in each software image including the vulnerable package.

At optional S790, an alert may be generated. The alert may indicate, for example but not limited to, the vulnerability that was identified, the identified vulnerable packages, the identified vulnerable software images (e.g., images containing the vulnerable packages), locations at which the vulnerable software images are deployed, combinations thereof, sand the like. The alert may be sent, for example, to a user device (e.g., the user device 140, FIG. 1).

It should be noted that FIG. 7 is discussed with respect to identifying one vulnerable package, but that multiple vulnerable packages may be identified without departing from the scope of the disclosure. Vulnerabilities in software images containing any identified vulnerable packages may be detected and remediated as described above.

Figure 8:
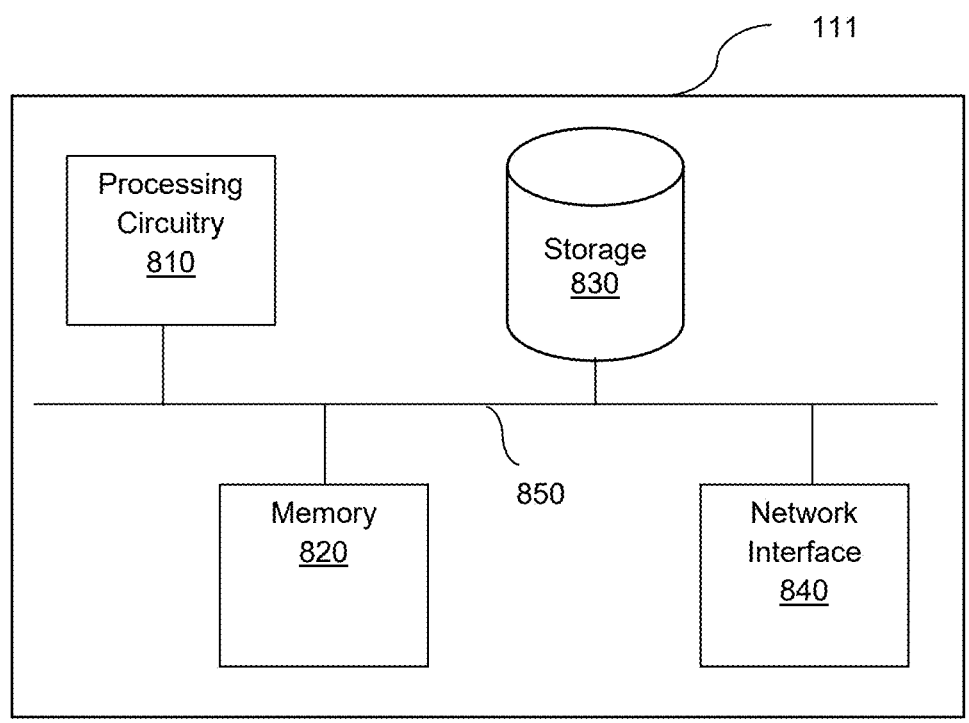
FIG. 8 is a schematic diagram of an image manager according to an embodiment.

FIG. 8 is an example schematic diagram of an image manager 111 according to an embodiment. The image manager 111 includes a processing circuitry 810 coupled to a memory 820, a storage 830, and a network interface 840. In an embodiment, the components of the image manager 111 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the image manager 111 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for vulnerability remediation, comprising:
   generating a plurality of software packages, wherein each software package of the plurality of software packages is generated using a respective set of code;
   building a plurality of software images based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images;
   storing the plurality of software images in a repository;
   identifying a vulnerable software package among the plurality of software packages based on cybersecurity data indicating a vulnerability;

identifying at least one vulnerable software image of the plurality of software images by determining that the at least one vulnerable software image contains the vulnerable software package based on the plurality of files; and performing at least one remediation action with respect to the at least one vulnerable software image.

2. The method of claim 1, wherein performing the at least one remediation action includes modifying a deployment of at least a portion of the at least one vulnerable software image.

3. The method of claim 2, wherein performing the at least one remediation action includes pulling a deployment of at least a portion of the at least one vulnerable software image.

4. The method of claim 2, wherein performing the at least one remediation action includes redeploying at least a portion of the at least one vulnerable software image.

5. The method of claim 2, wherein performing the at least one remediation action includes rebuilding at least a portion of the at least one vulnerable software image based on the plurality of files.

6. The method of claim 2, wherein the at least one vulnerable software image is a plurality of vulnerable software images, further comprising:
determining a subset of the plurality of vulnerable software images to be remediated based on a vulnerability status of each of the plurality of vulnerable software images, wherein the deployment of the determined subset of the plurality of vulnerable software images is modified.

7. The method of claim 6, wherein the vulnerability status of each of the plurality of vulnerable software images indicates whether the vulnerable software image contains a vulnerability that is actively being exploited, wherein the determined subset of the plurality of vulnerable software images is at least one vulnerable software image of the plurality of software images which contains a vulnerability that is actively being exploited.

8. The method of claim 1, wherein each software package is a unit of code defined with respect to at least one function.

9. A non-transitory computer-readable medium having stored thereon instructions for causing a processing circuitry to execute a process, the process comprising:
generating a plurality of software packages, wherein each software package of the plurality of software packages is generated using a respective set of code;
building a plurality of software images based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images;
storing the plurality of software images in a repository;
identifying a vulnerable software package among the plurality of software packages based on cybersecurity data indicating a vulnerability;
identifying at least one vulnerable software image of the plurality of software images by determining that the at least one vulnerable software image contains the vulnerable software package based on the plurality of files; and
performing at least one remediation action with respect to the at least one vulnerable software image.

10. A system for vulnerability remediation, comprising:
a processing circuitry; and
a memory, the memory containing instructions that, when executed by the processing circuitry, configure the system to:
generate a plurality of software packages, wherein each software package of the plurality of software packages is generated using a respective set of code;
build a plurality of software images based on a plurality of files, wherein each of the plurality of software images is built based on a corresponding file of the plurality of files, wherein each file of the plurality of files includes a set of instructions for combining a subset of the plurality of software packages in order to build the corresponding software image of the plurality of software images;
store the plurality of software images in a repository;
identify a vulnerable software package among the plurality of software packages based on cybersecurity data indicating a vulnerability;
identify at least one vulnerable software image of the plurality of software images by determining that the at least one vulnerable software image contains the vulnerable software package based on the plurality of files; and
perform at least one remediation action with respect to the at least one vulnerable software image.

11. The system of claim 10, wherein performing the at least one remediation action includes modifying a deployment of at least a portion of the at least one vulnerable software image.

12. The system of claim 11, wherein performing the at least one remediation action includes pulling a deployment of at least a portion of the at least one vulnerable software image.

13. The system of claim 11, wherein performing the at least one remediation action includes redeploying at least a portion of the at least one vulnerable software image.

14. The system of claim 11, wherein performing the at least one remediation action includes rebuilding at least a portion of the at least one vulnerable software image based on the plurality of files.

15. The system of claim 11, wherein the at least one vulnerable software image is a plurality of vulnerable software images, wherein the system is further configured to:
determine a subset of the plurality of vulnerable software images to be remediated based on a vulnerability status of each of the plurality of vulnerable software images, wherein the deployment of the determined subset of the plurality of vulnerable software images is modified.

16. The system of claim 15, wherein the vulnerability status of each of the plurality of vulnerable software images indicates whether the vulnerable software image contains a vulnerability that is actively being exploited, wherein the determined subset of the plurality of vulnerable software images is at least one vulnerable software image of the plurality of software images which contains a vulnerability that is actively being exploited.

17. The system of claim 10, wherein each software package is a unit of code defined with respect to at least one function.

\* \* \* \* \*